(12) United States Patent
Asakawa et al.

(10) Patent No.: US 7,176,250 B2
(45) Date of Patent: Feb. 13, 2007

(54) FLUORORESIN POWDER COATING COMPOSITION

(75) Inventors: Akihiko Asakawa, Ichihara (JP); Masaru Yamauchi, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 224 days.

(21) Appl. No.: 10/799,734

(22) Filed: Mar. 15, 2004

(65) Prior Publication Data

US 2004/0176542 A1 Sep. 9, 2004

Related U.S. Application Data

(63) Continuation of application No. PCT/JP02/10055, filed on Sep. 27, 2002.

(30) Foreign Application Priority Data

Sep. 27, 2001 (JP) .............................. 2001-295295

(51) Int. Cl.
*C08J 3/12* (2006.01)
(52) U.S. Cl. ...................... 523/340; 523/330; 523/332; 525/124; 525/326.3; 527/501
(58) Field of Classification Search ................ 523/340, 523/330, 332; 525/124, 326.3
See application file for complete search history.

(56) References Cited

U.S. PATENT DOCUMENTS

| | | | | |
|---|---|---|---|---|
| 3,758,634 A | * | 9/1973 | Labana et al. ............... | 523/437 |
| 3,943,082 A | | 3/1976 | Smith et al. ................ | 523/427 |
| 5,147,934 A | * | 9/1992 | Ito et al. ..................... | 525/124 |
| 5,439,896 A | | 8/1995 | Ito et al. ..................... | 525/107 |
| 5,898,043 A | * | 4/1999 | Uemae et al. ............... | 523/204 |
| 5,998,507 A | * | 12/1999 | Adachi et al. .............. | 523/340 |

FOREIGN PATENT DOCUMENTS

| | | |
|---|---|---|
| EP | 0 301 557 | 2/1989 |
| EP | 301557 A1 * | 2/1989 |
| EP | 0 845 483 A1 | 6/1998 |
| GB | 1 424 967 | 2/1976 |
| GB | 2325235 A * | 11/1998 |
| JP | 48-28550 | 4/1973 |
| JP | 50-51539 | 5/1975 |
| JP | 51-57725 | 5/1976 |
| JP | 51-52321 | 7/1976 |
| JP | 59-102962 | 6/1984 |
| JP | 61-57609 | 3/1986 |
| JP | 63-264675 | 11/1988 |
| JP | 1-103670 | 4/1989 |
| JP | 2-60968 | 3/1990 |

OTHER PUBLICATIONS

U.S. Appl. No. 10/799,734, filed Mar. 15, 2004, Asakawa et al.
U.S. Appl. No. 10/863,506, filed Jun. 9, 2004, Yamauchi et al.
U.S. Appl. No. 10/893,347, filed Jul. 19, 2004, Yamauchi et al.
U.S. Appl. No. 10/806,103, filed Mar. 23, 2004, Asakawa et al.

* cited by examiner

*Primary Examiner*—David W. Wu
*Assistant Examiner*—Henry S. Hu
(74) *Attorney, Agent, or Firm*—Oblon, Spivak, McClelland, Maier & Neustadt, P.C.

(57) ABSTRACT

A non-vinylidene fluororesin powder coating material having blocking resistance and high impact resistance, is provided. A fluororesin powder coating composition comprising a non-vinylidene fluororesin having a Tg higher than 40° C. and a resin having a Tg of from 0 to 40° C.

16 Claims, No Drawings

FLUORORESIN POWDER COATING COMPOSITION

TECHNICAL FIELD

The present invention relates to a non-vinylidene fluororesin powder coating material having blocking resistance and high impact resistance.

BACKGROUND ART

A solvent-soluble curable fluororesin coating material containing a copolymer of a fluoroolefin having a crosslinkable functional group with a vinyl ether or a vinyl ester (JP-A-59-102962, JP-A-61-57609) presents a coating film excellent in corrosion resistance, durability, stain-removal properties, etc., and has been widely used in recent years in e.g. a heavy duty corrosion prevention, building or industrial field.

However, a solvent coating material releases an organic solvent to the environment during its use and thus is regarded as a factor of environmental pollution. In order to cope with an environmental pollution problem which has been increasingly serious year after year, attention has been drawn to a fluororesin powder coating material Usually, a powder coating material is produced by melt-kneading a composition having a preliminarily pulverized resin component and other additives blended, followed by pulverization e.g. by a hammer mill, or produced by mixing such a resin composition as dissolved in a solvent, with other additives, followed by spray drying.

A powder coating material containing a polyvinylidene fluoride resin as the main component has a high crystallinity and thus is required to be baked at a high temperature of at least 200° C., and it further has a problem that a coating film having adequate gloss can hardly be obtainable, whereby the application is rather limited.

JP-A-2-60968 proposes a powder coating material containing a copolymer of a fluoroolefin having a crosslinkable functional group with a vinyl ether or a vinyl ester.

Here, there is no disclosure of the glass transition temperature (Tg) of this copolymer, but with a copolymer having a Tg of at most 40° C., the lower the Tg, the lower the blocking resistance. Here, the blocking resistance means a nature to prevent fusion of particles to one another during the storage of the powder coating material. Further, it is required to carry out pulverization at a low temperature at the time of preparation of the powder coating material, whereby a low temperature energy is required only for the purpose of pulverization, thus leading to an increase of costs.

On the other hand, a powder coating material containing as the main material a non-vinylidene fluororesin having a Tg higher than 40° C., is excellent in efficiency in the pulverization and in blocking resistance of the obtained powder, but it has had a problem that when impact resistance higher than a conventional level is required, such a requirement can not be satisfied.

DISCLOSURE OF THE INVENTION

Under these circumstances, the present inventors have conducted an extensive study and as a result, have found a non-vinylidene fluororesin powder coating material which is excellent in weather resistance and corrosion resistance and yet can be pulverized at room temperature and which is excellent in blocking resistance of the obtained powder and is capable of satisfying the requirement for higher impact resistance than before, and have arrived at the present invention.

Namely, the present invention has the following gists.

(1) A fluororesin powder coating composition characterized by comprising a non-vinylidene fluororesin having a Tg higher than 40° C. and a resin having a Tg of from 10 to 40° C.

(2) The fluororesin powder coating composition according to the above (1), wherein the blend ratio (mass ratio) of the non-vinylidene fluororesin having a Tg higher than 40° C./the resin having a Tg of from 0 to 40° C., is from 95/5 to 30/70.

(3) The fluororesin powder coating composition according to the above (1) or (2), characterized in that the non-vinylidene fluororesin has crosslinkable reactive groups, and the fluororesin powder coating composition contains a curing agent capable of reacting with the crosslinkable reactive groups to form crosslinkages.

(4) The fluororesin powder coating composition according to the above (3), wherein the crosslinkable reactive groups are hydroxyl groups, carboxyl groups, amide groups, amino groups, mercapto groups, glycidyl groups, active halogen groups, isocyanate groups or hydrolysable silyl groups.

(5) The fluororesin powder coating composition according to any one of the above (1) to (4), wherein the resin having a Tg of from 0 to 40° C. is an acrylic resin, a polyester resin or a non-vinylidene fluororesin.

(6) The fluororesin powder coating composition according to any one of the above (1) to (5), wherein the non-vinylidene fluororesin having a Tg of from 0 to 40° C. is curable with a curing agent which is capable of curing the non-vinylidene fluororesin having a Tg higher than 40° C.

(7) The fluororesin powder coating composition according to any one of the above (1) to (6), wherein the non-vinylidene fluororesin comprises fluoroolefin units and monomer units copolymerizable with the fluoroolefin units.

BEST MODE FOR CARRYING OUT THE INVENTION

The fluororesin powder coating composition of the present invention comprises at least a non-vinylidene fluororesin having a Tg higher than 40° C. If Tg of the non-vinylidene fluororesin of the present invention is not higher than 40° C., blocking is likely to occur, whereby preparation (pulverization) of a powder coating material tends to be difficult, and the object of the present invention can hardly be accomplished. Particularly, Tg of the non-vinylidene fluororesin is preferably from 40 to 70° C., especially preferably from 50 to 65° C.

The non-vinylidene fluororesin in the present invention comprises fluoroolefin units and monomer units copolymerizable with the fluoroolefin and preferably have crosslinkable reactive groups. As the material for the fluoroolefin units, one such as tetrafluoroethylene (TFE), chlorotrifluoroethylene (CTFE), trifluoroethylene, hexafluoropropylene (HFP) or pentafluoropropylene, may, for example, be used. Further, vinylidene fluoride may also be used in a small amount, but a resin composed mainly of vinylidene fluoride, is excluded.

As the monomer copolymerizable with the fluoroolefin, one which will not substantially impair the weather resistance of the coating film, may be used. Usually, an ethylenically unsaturated compound, for example, an alkyl vinyl ether such as ethyl vinyl ether, propyl vinyl ether, (iso)butyl vinyl ether, 2-ethylhexyl vinyl ether or cyclohexyl vinyl ether; an ester of an alkylcarboxylic acid with a vinyl alcohol, such as vinyl acetate, vinyl propionate, vinyl (iso) butyrate, vinyl valerate or vinyl cyclohexanecarboxylate; an ester of an aromatic carboxylic acid with a vinyl alcohol, such as vinyl benzoate; an alkyl allyl ether such as ethyl allyl ether, propyl allyl ether, (iso)butyl allyl ether or cyclohexyl allyl ether; an alkyl allyl ester such as ethyl allyl ester, propyl allyl ester or (iso)butyl allyl ester; an alkene such as ethylene, propylene or (iso)butylene; or (meth)acrylate such as methyl (meth)acrylate, ethyl (meth)acrylate, propyl (meth)acrylate, (iso)butyl (meth)acrylate or 2-ethylhexyl (meth)acrylate, may, for example, be mentioned. These monomers may be used alone or in combination of two or more of them.

The crosslinkable reactive groups may, for example, be hydroxyl groups, carboxyl groups, amide groups, amino groups, mercapto groups, glycidyl groups, halogen atoms such as bromine or iodine, isocyanate groups or hydrolysable silyl groups.

A method for introducing crosslinkable reactive groups to the non-vinylidene fluororesin may, for example, be a method of copolymerizing a monomer having a crosslinkable reactive group, a method of partially decomposing a copolymer, or a method of reacting functional groups of a copolymer with a compound capable of presenting a crosslinkable reactive group.

As the monomer having a crosslinkable reactive group, a monomer having a hydroxyl group, a carboxyl group, an amide group, an amino group, a mercapto group, a glycidyl group or an isocyanate group, or a hydrolysable silyl group, may, for example, be mentioned.

For example, a monomer having a hydroxyl group may be a hydroxyalkyl vinyl ether such as hydroxyethyl vinyl ether, hydroxypropyl vinyl ether, hydroxybutyl vinyl ether or hydroxycyclohexyl vinyl ether; an ester of a hydroxyalkylcarboxylic acid with a vinyl alcohol, such as vinyl hydroxyacetate, vinyl hydroxypropionate, vinyl hydroxybutyrate or vinyl hydroxycyclohexanecarboxylate; a hydroxyalkyl allyl ether such as hydroxyethyl allyl ether, hydroxypropyl allyl ether or hydroxybutyl allyl ether; a hydroxyalkyl allyl ester such as hydroxyethyl allyl ester, hydroxypropyl allyl ester or hydroxybutyl allyl ester; or a hydroxyalkyl (meth)acrylate such as 2-hydroxyethyl acrylate, hydroxypropyl acrylate or 2-hydroxyethyl methacrylate, or a compound having such a monomer partially fluorinated.

A monomer having a carboxyl group may, for example, be undecylenic acid, (meth)acrylic acid or a carboxylalkyl allyl ether.

A monomer having an amide group may, for example, be (meth)acrylamide or N-methylolacrylamide.

A monomer having an amino group may, for example, be an aminoalkyl vinyl ether, or an aminoalkyl allyl ether.

Further, a monomer having a glycidyl group, may, for example, be glycidyl (meth)acrylate, glycidyl vinyl ether or glycidyl allyl ether.

A monomer having an isocyanate group may, for example, be vinyl isocyanate or isocyanate ethylene acrylate.

As a monomer capable of presenting the above-mentioned crosslinkable site, a vinyl or allyl compound is preferably employed from the copolymerizability with a fluoroolefin.

In a case where the non-vinylidene fluororesin has crosslinkable reactive groups, the fluororesin powder coating composition of the present invention preferably further contains a curing agent capable of reacting with the crosslinkable reactive groups to form crosslinkages. As such a curing agent, in a case where the crosslinkable sites are hydroxyl groups, a compound having an isocyanate group, a carboxyl group or the like, or a melamine resin, may, for example, be used as the curing agent.

In a case where the crosslinkable sites are carboxyl groups, a compound having a hydroxyl group, an amino group, an isocyanate group, a glycidyl group or the like, may, for example, be used as the curing agent.

In a case where the crosslinkable sites are amino groups, a compound having a carboxyl group, a glycidyl group, an isocyanate group or the like, may, for example, be used as the curing agent.

In a case where the crosslinkable sites are glycidyl groups, a compound having a hydroxyl group, a carboxyl group, an amino group, an isocyanate group, a hydrazide group or the like, may, for example, be used as the curing agent.

In a case where the crosslinkable sites are isocyanate groups, a compound having a hydroxyl group, a carboxyl group, an amino group or the like, may, for example, be used as the curing agent.

The compound having an isocyanate group may, for example, be a blocked isocyanate compound, for example, a compound obtained by blocking an isocyanate group of an isocyanate compound, such as a polyisocyanate compound such as isophorone diisocyanate, tolylene diisocyanate, xylylene diisocyanate, 4,4'-diphenylmethane diisocyanate or hexamethylene diisocyanate, or a dimmer or trimer thereof, or a polyisocyanate compound modified with a polyhydric alcohol such as trimethylolpropane, with a blocking agent such as ε-caprolactam, phenol, benzyl alcohol or methyl ethyl ketone oxime.

The compound having a carboxyl group may, for example, be an aliphatic dibasic acid such as fumaric acid, succinic acid, adipic acid, azelaic acid, sebacic acid or dodecanoic diacid, an acid anhydride such as phthalic anhydride, trimellitic anhydride or pyromellitic anhydride, or a polyester resin or acrylic resin having an acid value.

The compound having a glycidyl group may, for example, be diglycidyl terephthalate, diglycidyl paraoxybenzoate, triglycidyl isocyanate, spiroglycol diglycidyl ether or an alicyclic epoxy resin.

The compound having a hydroxyl group may, for example, be 1,4-bis-2'-hydroxyethoxybenzene, bishydroxyethyl terephthalate, a styrene/allyl alcohol copolymer, spiroglycol or a polyester or acrylic resin having a hydroxyl value.

Further, dicyandiamide and a dicyandiamide derivative, imidazole and an imidazole derivative, a dibasic acid dihydrazide, diaminodiphenylmethane, cyclic amidine or a hydantoin compound may, for example, be used.

The non-vinylidene fluororesin having a Tg higher than 40° C. can be obtained by optionally selecting the type of a fluoroolefin, the type of a monomer copolymerizable with the fluoroolefin, the type of a monomer having a crosslinkable reactive functional group and the compositional ratio thereof.

The fluororesin powder coating composition of the present invention further contains a resin having a Tg of from 0 to 40° C. Here, if a resin having a Tg lower than 0° C., is used, the fluororesin powder coating composition of the present invention tends to undergo blocking. On the other hand, if a resin having a Tg higher than 40° C. is used, the dispersibility with the non-vinylidene fluororesin having a Tg higher than 40° C., tends to be poor, whereby the purpose of the present invention can hardly be accomplished. It is particularly preferred that Tg of the above resin is from 10 to 40° C., especially from 20 to 40° C.

As the resin having a Tg of from 0 to 40° C. to be used in the present invention, an acrylic resin, a polyester resin or a non-vinylidene fluororesin may, for example, be used.

The acrylic resin may, for example, be a copolymer of methyl methacrylate with ethyl methacrylate, propyl methacrylate, n-butyl methacrylate, isobutyl methacrylate, t-butyl methacrylate, n-hexyl methacrylate, cyclohexyl methacrylate, lauryl methacrylate, 2-ethylhexyl methacrylate, methyl acrylate, ethyl acrylate, propyl acrylate, n-butyl acrylate, isobutyl acrylate, t-butyl acrylate, n-hexyl acrylate, cyclohexyl acrylate, lauryl acrylate or 2-ethylhexyl acrylate.

The polyester is a condensate of a polybasic carboxylic acid and a polyhydric alcohol. As the carboxylic acid component, terephthalic acid or isophthalic acid is the main component, and an aromatic dicarboxylic acid such as 2,6-naphthalene dicarboxylic acid; an aliphatic dicarboxylic acid such as succinic acid or adipic acid; or an alicyclic dicarboxylic acid, may, for example, be mentioned. Further, as the carboxylic acid component, a trivalent or higher valent carboxylic acid may be contained in a small amount.

With respect to the above polyhydric alcohol, as a dihydric alcohol, ethylene glycol, diethylene glycol or 1,2-propanediol, or as a trihydric alcohol, trimethylolethane, trimethylolpropane or 3-methylpentane-1,3,5-triol, may, for example be mentioned, and a tetrahydric or higher hydric alcohol may also be used.

As the non-vinylidene fluororesin, one comprising the same fluoroolefin units and monomer units copolymerizable with the fluoroolefin, as in the case of the non-vinylidene fluororesin having a Tg higher than 40° C., may be employed.

This resin having a Tg of from 0 to 40° C. may not have crosslinkable reactive groups, but preferably has crosslinkable reactive groups such as hydroxyl groups, carboxyl groups, amide groups, amino groups, mercapto groups, glycidyl groups or isocyanate groups.

As a method for introducing such crosslinkable reactive groups, in a case where the resin having a Tg of from 0 to 40° C. is a non-vinylidene fluororesin, a method of copolymerizing a monomer having a crosslinkable reactive group used for the non-vinylidene fluororesin having a Tg higher than 40° C., may be employed.

In a case where the resin having a Tg of from 0 to 40° C. is an acrylic resin, a method of copolymerizing an unsaturated carboxylic acid such as acrylic acid, methacrylic acid, maleic acid or crotonic acid; a hydroxyalkyl (meth)acrylate such as 2-hydroxyethyl acrylate, hydroxypropyl acrylate or 2-hydroxyethyl methacrylate; an epoxy group-containing (meth)acrylate such as glycidyl (meth)acrylate, may be employed.

This non-vinylidene fluororesin having a Tg of from 0 to 40° C. is preferably curable with a curing agent which is capable of curing the non-vinylidene fluororesin having a Tg higher than 40° C.

Among the resins having a Tg of from 0 to 40° C., the non-vinylidene fluororesin is preferred from the viewpoint of the weather resistance and solvent resistance of the coating film, and the compatibility with the non-vinylidene fluororesin having a Tg higher than 40° C. This non-vinylidene fluororesin more preferably has crosslinkable reactive groups. It is further preferred that the non-vinylidene fluororesin having a Tg of from 0 to 40° C. is curable with a curing agent which is capable of curing the non-vinylidene fluororesin having a Tg higher than 40° C., whereby the stain resistance and solvent resistance of the coating film can further be improved.

By blending the non-vinylidene fluororesin having a Tg higher than 40° C. and the resin having a Tg of from 0 to 40° C., the impact resistance can be improved while maintaining the pulverization efficiency at the time of the pulverization and the blocking resistance of the obtained powder, as the characteristics of the non-vinylidene fluororesin having a Tg higher than 40° C. and the weather resistance, solvent resistance, stain resistance, etc. as the characteristics of the non-vinylidene fluororesin.

The blend ratio (mass ratio) of the non-vinylidene fluororesin having a Tg higher than 40° C./the resin having a Tg of from 0 to 40° C., is preferably from 95/5 to 30/70, more preferably from 80/20 to 50/50. By maintaining this blend ratio, the above-mentioned various characteristics can be maintained at high levels in good balance.

EXAMPLES

Now, the present invention will be described in further detail with reference to Examples.

In the following Preparation Examples, Working Examples and Comparative Examples, "parts" and "%" mean "parts by mass" and "mass %", unless otherwise specified.

Preparation Example 1

Into a pressure resistant reactor (pressure resistance: 5.0 MPa) made of stainless steel, having an internal capacity of 300 mL and equipped with a stirrer, 100 g of xylene, 35 g of cyclohexyl vinyl ether (CHVE), 5 g of ethyl vinyl ether (EVE), 10 g of 4-hydroxybutyl vinyl ether (HBVE), 1 g of calcium carbonate and 0.07 g of perbutyl pivalate (PBPV) were charged, and dissolved oxygen in the liquid was removed by solidification/deaeration by liquid nitrogen.

Then, 50 g of chlorotrifluoroethylene (CTFE) was introduced, and the temperature was gradually raised. While maintaining the temperature at 65° C., the reaction was continued.

10 Hours later, the reactor was cooled with water to stop the reaction. This reaction solution was cooled to room temperature, and then, unreacted monomers were purged. The obtained reaction solution was filtered through diatomaceous earth to remove solid substances thereby to obtain a fluorinated copolymer solution having a solid content concentration of about 50%. From this solution, xylene and liquid unreacted monomers were removed by an evaporator, followed by drying under reduced pressure to obtain a fluorinated copolymer A-1 having a Tg of 55° C.

Preparation Examples 2 to 5

Fluorinated copolymers A-2 to A-5 were obtained in the same manner as in Preparation Example 1 except that the monomer composition was changed as shown in Table 1.

TABLE 1

|  |  | Preparation Example No. | | | | |
| --- | --- | --- | --- | --- | --- | --- |
|  |  | 1 | 2 | 3 | 4 | 5 |
| Monomer composition (%) | CTFE | 50 | 50 | 50 | 50 |  |
|  | VdF |  |  |  |  | 78 |
|  | TFE |  |  |  |  | 16 |

TABLE 1-continued

| | | Preparation Example No. | | | | |
|---|---|---|---|---|---|---|
| | | 1 | 2 | 3 | 4 | 5 |
| | HFP | | | | | 3 |
| | CHVE | 35 | 20 | 25 | | |
| | EVE | 5 | 20 | | 30 | |
| | MMA | | | 10 | | |
| | Vinyl benzoate | | | 10 | 5 | |
| | Veova 10 | | | | | 5 |
| | HBVE | 10 | 10 | 5 | 5 | |
| Solid content concentration (%) | | 50 | 47 | 48 | 47 | 40 |
| Glass transition temperature (Tg) | | 55° C. | 30° C. | 55° C. | 20° C. | 5° C. |
| Fluorinated copolymer (identification) | | A-1 | A-2 | A-3 | A-4 | A-5 |

In Table 1,
CTFE: Chlorotrifluoroethylene
VdF: Vinylidene fluoride
TFE: Tetrafluoroethylene
HFP: Hexafluoropropylene
CHVE: Cyclohexyl vinyl ether
EVE: Ethyl vinyl ether
HBVE: 4-Hydroxybutyl vinyl ether
Veova 10: Alkyl vinyl ester Preparation Example 6

Into a reactor made of stainless steel, having an internal capacity of 300 ml and equipped with a stirrer, 100 g of xylene, 60 g of methyl methacrylate (MMA), 30 g of n-butyl methacrylate (nBMA), 10 g of 2-hydroxyethyl methacrylate (HEMA) and 0.07 g of perbutyl pivalate (PBPV) were charged, and dissolved oxygen in the liquid was removed by solidification/deaeration by liquid nitrogen.

This solution was heated and maintained at a temperature of 70° C., and the reaction was continued with stirring.

5 Hours later, the reactor was cooled with water to stop the reaction. This reaction solution was cooled to room temperature to obtain an acrylic copolymer solution having a solid content concentration of about 50%. From this solution, xylene and unreacted monomers were removed by an evaporator, followed by drying under reduced pressure to obtain an acrylic copolymer A-6 having a Tg of 15° C.

Preparation Example 7

An acrylic copolymer A-7 was obtained in the same manner as in Preparation Example 6 except that the monomer composition was changed as shown in Table 2.

TABLE 2

| | | Preparation Example No. | |
|---|---|---|---|
| | | 6 | 7 |
| Monomer compostition (%) | MMA | 60 | 5 |
| | nBMA | 30 | 25 |
| | EA | | 63 |
| | HEMA | 10 | 7 |
| Solid content concentration (%) | | 50 | 50 |
| Glass transition temperature (Tg) | | 75° C. | −10° C. |

TABLE 2-continued

| | Preparation Example No. | |
|---|---|---|
| | 6 | 7 |
| Acryl copolymer (identification) | A-6 | A-7 |

Example 1

50 Parts of the fluorinated copolymer A-1, 47 parts of A-2, 20 parts of adduct B-1530 (ε-caprolactam blocked isocyanate, manufactured by Hüls Corp, solid content: 100%) as a curing agent, 0.5 part of Modaflow (leveling agent manufactured by Monsanto Company), 0.5 part of benzoin and 30 parts of titanium dioxide, as additives, and 0.1 part of tridecyl phosphite as an oxidation stabilizer, were mixed by a high speed mixer and melt-kneaded by a twin screw extruder heated at 120° C. Thereafter, pulverization was carried out by means of a pin mill, and classification was carried out by means of a 180 mesh screen to obtain a powder coating material having a 50% average volume particle size of about 40 μm.

The obtained resin solution was passed through a spray drying apparatus for an organic solvent (Turning type spray dryer, manufactured by Sakamoto Giken K. K.) connected to a bottom discharge tube, to obtain a spherical powder coating material having an average particle size of 15 μm.

The obtained powder coating material was electrostatically coated on a zinc phosphate-treated steel plate and cured for 20 minutes in an oven of 180° C. to obtain a coating film.

With respect to the obtained coating film, the physical properties were evaluated. The results are shown in Table 3.

The physical properties were evaluated as follows.

Impact Resistance

By a DuPont impact (½ inch, weight: 1 kg, height: 50 cm) test, the change in appearance was examined.
  ○: No cracking or peeling of the coating film observed.
  Δ: Cracking or peeling of the coating film partially observed.
  X: Cracking or peeling of the coating film substantially observed.

Blocking Resistance

With respect to the powder coating material after storage at 40° C. for 7 days, evaluation was made under the following standards.
  ○: No blocking observed.
  Δ: Blocks observed but cannot be pinched by fingers.
  X: Blocks which can be pinched by fingers, observed.

Weather Resistance

After 3000 hours in a sunshine carbon weather meter, the appearance of the coating film was visually evaluated.
  ○: No substantial surface deterioration of the coating film observed.
  Δ: Surface deterioration of the coating film observed.
  X: Substantial surface deterioration and chalking were observed.

Appearance of the Coating Film (Smoothness)

The surface state (the seeding state) of the coating film was visually evaluated.
  ○: No abnormality observed.

Δ: Slight seeding observed.
X: Substantial seeding observed.

The results are shown in Table 3 together with the results of Example 1.

TABLE 3

| | | Examples | | | | Comparative Examples | | | |
|---|---|---|---|---|---|---|---|---|---|
| | | 1 | 2 | 3 | 4 | 1 | 2 | 3 | 4 |
| Copolymers | A-1 | 50 | 75 | | 85 | 50 | 70 | 75 | 100 |
| | A-2 | 47 | | 47 | | | | | |
| | A-3 | | | 48 | | 48 | | | |
| | A-4 | | 24 | | | | | | |
| | A-5 | | | | 15 | | | | |
| | A-6 | | | | | | 30 | | |
| | A-7 | | | | | | | 25 | |
| Curing agent | Adduct B-1530 | 20 | 15 | 15 | 18 | 20 | 20 | 12 | 20 |
| Additives | Modaflow | 0.5 | 0.5 | 0.5 | 0.5 | 0.5 | 0.5 | 0.5 | 0.5 |
| | Benzoin | 0.5 | 0.5 | 0.5 | 0.5 | 0.5 | 0.5 | 0.5 | 0.5 |
| | Titanium dioxide | 30 | 30 | 30 | 30 | 30 | 30 | 30 | 30 |
| Oxidation stabilizer | Tridecyl phosphite | 0.1 | 0.1 | 0.1 | 0.1 | 0.1 | 0.1 | 0.1 | 0.1 |
| Coating conditions | Baking temp (° C.) | 180 | 180 | 180 | 180 | 180 | 180 | 180 | 180 |
| | Baking time (min) | 20 | 20 | 20 | 20 | 20 | 20 | 20 | 20 |
| Impact resistance | | ○ | ○ | ○ | ○ | X | X | ○ | X |
| Blocking resistance | | ○ | ○ | ○ | ○ | ○ | ○ | X | ○ |
| Weather resistance | | ○ | ○ | ○ | Δ | ○ | Δ | Δ | ○ |
| Appearance of the coating | | ○ | ○ | ○ | ○ | ○ | Δ | ○ | ○ |
| Stain resistance | | ○ | ○ | ○ | ○ | ○ | ○ | Δ | ○ |

Stain Resistance

After outdoor exposure at an angle of 45° facing south in Kawasaki City for 3 months, the stain of the coating film was visually evaluated.
 ○: The stain on the surface can easily be wiped off.
 Δ: The stain on the surface can be removed by cleaning.
 X: Substantial stain is attached to the surface and can not be removed even by cleaning.

Further, the same composition as above was dried under reduced pressure instead of spray drying, melt-kneaded by a melt kneader, then left to cool and pulverized at room temperature by a hammer mill, whereby it was easily pulverized.

Examples 2 and 3 and Comparative Examples 1, 2 and 4

Powder coating materials (50% volume average particle size: about 40 μm) were obtained in the same manner as in Example 1 except that the components as disclosed in Table 3 were employed, and the electrostatic coating was carried out in the same manner as in Example 1 except that these coating materials were used, and the physical properties of the obtained coating films were evaluated.

Example 4 and Comparative Example 3

Using the components as identified in Table 3, melt kneading was carried out in the same manner as in Example 1, and then, freeze pulverization by means of a pin mill was carried out together with liquid nitrogen to obtain powder coating materials (50% volume average particle size: about 30 μm), and electrostatic coating was carried out in the same manner as in Example 1 except that these coating materials were used, and the physical properties of the obtained coating films were evaluated.

As is evident from the foregoing, the impact resistance can not be improved by blending non-vinylidene fluororesins having a Tg higher than 40° C. one another or by blending a non-vinylidene fluororesin having a Tg higher than 40° C. with an acrylic resin having the same Tg, and a non-vinylidene fluororesin having a Tg of not higher than 40° C., is poor in blocking resistance. Whereas, the fluororesin powder coating composition comprising a non-vinylidene fluororesin having a Tg higher than 40° C. and a resin having a Tg of from 0 to 40° C., has high impact resistance and further is excellent in blocking resistance.

Particularly, it is evident that in a case where, as in Examples 1 to 4, the resin having a Tg of from 0 to 40° C. is curable with a curing agent capable of curing the non-vinylidene fluororesin having a Tg higher than 40° C., each of the impact resistance, blocking resistance, weather resistance, appearance of the coating and stain resistance, is excellent.

INDUSTRIAL APPLICABILITY

According to the present invention, it is possible to obtain a non-vinylidene fluororesin powder coating material which is excellent in weather resistance and corrosion resistance and can be pulverized at room temperature and which is excellent in blocking resistance of the obtained powder and can satisfy the demand for impact resistance higher than the conventional level.

The entire disclosure of Japanese Patent Application No. 2001-295295 filed on Sep. 27, 2001 including specification, claims and summary is incorporated herein by reference in its entirety.

What is claimed is:

1. A fluororesin powder coating composition characterized by comprising a non-vinylidene fluororesin having a Tg higher than 40° C. and a resin having a Tg of from 0 to 40°

C., wherein the resin having a Tg of from 0 to 40° C. has crosslinkable reactive groups.

2. The fluororesin powder coating composition according to claim 1, wherein the blend ratio (mass ratio) of the non-vinylidene fluororesin having a Tg higher than 40° C./the resin having a Tg of from 0 to 40° C., is from 95/5 to 30/70.

3. The fluororesin powder coating composition according to claim 2, wherein the blend ratio (mass ratio) of the non-vinylidene fluororesin having a Tg higher than 40° C./the resin having a Tg of from 0 to 40° C., is from 80/20 to 50/50.

4. The fluororesin powder coating composition according to claim 1, wherein the non-vinylidene fluororesin has crosslinkable reactive groups, and the fluororesin powder coating composition contains a curing agent capable of reacting with the crosslinkable reactive groups to form crosslinkages.

5. The fluororesin powder coating composition according to claim 4, wherein the crosslinkable reactive groups are hydroxyl groups, carboxyl groups, amide groups, amino groups, mercapto groups, glycidyl groups, halogen atoms, isocyanate groups or hydrolysable silyl groups.

6. The fluororesin powder coating composition according to claim 1, wherein the resin having a Tg of from 0 to 40° C. is an acrylic resin, a polyester resin or a non-vinylidene fluororesin.

7. The fluororesin powder coating composition according to claim 6, wherein the resin having a Tg of from 0 to 40° C. is an acrylic resin.

8. The fluororesin powder coating composition according to claim 6, wherein the resin having a Tg of from 0 to 40° C. is a polyester resin.

9. The fluororesin powder coating composition according to claim 6, wherein the resin having a Tg of from 0 to 40° C. is a non-vinylidene fluororesin.

10. The fluororesin powder coating composition according to claim 6, wherein the resin having a Tg of from 0 to 40° C. is a non-vinylidene fluororesin which is curable with a curing agent which is capable of curing the non-vinylidene fluororesin having a Tg higher than 40° C.

11. The fluororesin powder coating composition according to claim 1, wherein the non-vinylidene fluororesin comprises fluoroolefin units and monomer units copolymerizable with the fluoroolefin units.

12. The fluororesin powder coating composition according to claim 1, wherein the crosslinkable reactive groups of the resin having a Tg of from 0 to 40° C. are hydroxyl groups, carboxyl groups, amide groups, amino groups, mercapto groups, glycidyl groups, or isocyanate groups.

13. The fluororesin powder coating composition according to claim 1, wherein the non-vinylidene fluororesin has a Tg of from 40° C. to 70° C.

14. The fluororesin powder coating composition according to claim 1, wherein the non-vinylidene fluororesin has a Tg of from 50° C. to 65° C.

15. The fluororesin powder coating composition according to claim 1, wherein the resin having a Tg of from 0 to 40° C. has a Tg of 10 to 40° C.

16. The fluororesin powder coating composition according to claim 1, wherein the resin having a Tg of from 0 to 40° C. has a Tg of 20 to 40° C.

* * * * *